US011965345B2

(12) United States Patent
Halonen et al.

(10) Patent No.: US 11,965,345 B2
(45) Date of Patent: Apr. 23, 2024

(54) CONCRETE SCREEDING MACHINE FOR TILT-UP PANELS

(71) Applicant: Somero Enterprises, Inc., Ft. Myers, FL (US)

(72) Inventors: Philip D. Halonen, Calumet, MI (US); James E. Kangas, Calumet, MI (US); Matthew A. Kangas, Atlantic Mine, MI (US); Mark A. Pietila, Atlantic Mine, MI (US)

(73) Assignee: Somero Enterprises, Inc., Ft. Myers, FL (US)

( * ) Notice: Subject to any disclaimer, the term of this patent is extended or adjusted under 35 U.S.C. 154(b) by 110 days.

(21) Appl. No.: 17/445,960

(22) Filed: Aug. 26, 2021

(65) Prior Publication Data

US 2022/0064971 A1 Mar. 3, 2022

Related U.S. Application Data

(60) Provisional application No. 62/706,576, filed on Aug. 26, 2020.

(51) Int. Cl.
*E04G 21/10* (2006.01)
*B28B 11/08* (2006.01)
(Continued)

(52) U.S. Cl.
CPC .......... *E04G 21/10* (2013.01); *B28B 11/0845* (2013.01); *B28B 11/0881* (2013.01);
(Continued)

(58) Field of Classification Search
CPC . E04G 21/10; E04B 1/04; E04B 1/355; B28B 11/0845; B28B 11/0881; B28B 15/002; B28B 17/0081
(Continued)

(56) References Cited

U.S. PATENT DOCUMENTS 2,948,202 A * 8/1960 Millikin .................. E01C 19/42 404/119
3,113,494 A * 12/1963 Barnes .................. E01C 19/405 404/114

(Continued)

OTHER PUBLICATIONS

International Search Report and Written Opinion dated Nov. 30, 2021 from corresponding PCT Application No. PCT/US2021/071285 filed Aug. 26, 2021.

*Primary Examiner* — Raymond W Addie
(74) *Attorney, Agent, or Firm* — HONIGMAN LLP

(57) ABSTRACT

A screeding machine includes a base unit positionable at framework that defines a concrete structure and a screed head assembly movably mounted at the base via an extendable and retractable mechanism. The screed head assembly includes a grade establishing member, a vibrating member, and elevation actuators for adjusting elevation of the screed head assembly. The screed head assembly is positioned at a screeding location via extension of the extendable and retractable mechanism and is movable over the uncured concrete in a screeding direction via retraction of the extendable and retractable mechanism. Adjustable wings disposed at and in front of the grade establishing member in the screeding direction are movable along the grade establishing member. When one of the ends of the screed head assembly is positioned at a frame portion, the wing at that end of the screed head assembly is moved to position the wing at the frame portion.

39 Claims, 9 Drawing Sheets

(51) Int. Cl.
*B28B 15/00* (2006.01)
*B28B 17/00* (2006.01)
*E04B 1/04* (2006.01)
*E04B 1/35* (2006.01)

(52) U.S. Cl.
CPC ........ *B28B 15/002* (2013.01); *B28B 17/0081* (2013.01); *E04B 1/04* (2013.01); *E04B 1/355* (2013.01)

(58) Field of Classification Search
USPC ....................................... 404/84.05, 113, 120
See application file for complete search history.

(56) References Cited

U.S. PATENT DOCUMENTS

| | | | | |
|---|---|---|---|---|
| 4,102,590 | A * | 7/1978 | Zanzie | E01C 19/182 404/104 |
| 4,655,633 | A | 4/1987 | Somero et al. | |
| 4,930,935 | A | 6/1990 | Quenzi et al. | |
| 5,779,390 | A * | 7/1998 | Tuusinen | E01C 19/15 404/101 |
| 6,129,481 | A * | 10/2000 | Tapio | E04G 21/10 404/102 |
| 6,227,761 | B1 | 5/2001 | Kieranen et al. | |
| 6,672,797 | B1 * | 1/2004 | Zachman | E02F 3/847 404/84.5 |
| 6,860,676 | B2 * | 3/2005 | Pont Feixes | E01C 19/405 404/118 |
| 6,976,805 | B2 | 12/2005 | Quenzi et al. | |
| 7,044,681 | B2 | 5/2006 | Quenzi et al. | |
| 7,121,762 | B2 | 10/2006 | Quenzi et al. | |
| 7,171,787 | B2 | 2/2007 | Thomason et al. | |
| 7,175,363 | B2 | 2/2007 | Quenzi et al. | |
| 7,195,423 | B2 | 3/2007 | Halonen et al. | |
| 7,311,466 | B2 * | 12/2007 | Torvinen | E01C 19/15 404/118 |
| 7,396,186 | B2 | 7/2008 | Quenzi et al. | |
| 7,850,396 | B2 | 12/2010 | Pietila et al. | |
| 8,038,366 | B2 | 10/2011 | Halonen et al. | |
| 9,835,610 | B2 | 12/2017 | Kangas | |
| 10,190,268 | B2 | 1/2019 | Pietila et al. | |
| 10,494,776 | B2 | 12/2019 | Pietila et al. | |
| 10,895,045 | B2 | 1/2021 | Kangas | |
| 2005/0069385 | A1 * | 3/2005 | Quenzi | E01C 19/44 404/114 |
| 2007/0116520 | A1 * | 5/2007 | Quenzi | E01C 19/405 404/114 |
| 2009/0092444 | A1 | 4/2009 | Schoen | |
| 2010/0196096 | A1 * | 8/2010 | Halonen | E01C 19/405 404/84.1 |
| 2016/0122952 | A1 | 5/2016 | Pietila et al. | |
| 2017/0101745 | A1 | 4/2017 | Terstriep | |

* cited by examiner

CONCRETE SCREEDING MACHINE FOR TILT-UP PANELS

CROSS REFERENCE TO RELATED APPLICATION

The present application claims the filing benefits of U.S. provisional application Ser. No. 62/706,576, filed Aug. 26, 2020, which is hereby incorporated herein by reference in its entirety.

FIELD OF THE INVENTION

The present invention relates generally to an apparatus and method for screeding freshly poured concrete that has been placed over a support surface and, more particularly, to an apparatus and method for screeding concrete for a tilt-up panel.

BACKGROUND OF THE INVENTION

Screeding devices or machines are used to level and smooth uncured concrete to a desired grade. Known screeding machines typically include a screed head, which includes a vibrating member and a grade setting device, such as a plow and/or an auger device. Such screeding machines are used to smooth and screed concrete placed over a horizontal support surface, such as a floor of a building or structure. However, such conventional screeding machines are not suitable for screeding concrete placed for a tilt-up panel of a building. As shown in FIGS. 1-4, such tilt-up panels are formed or defined by forms or frames (such as wooden framework) that establish windows and perimeter edges of the concrete tilt-up panel.

SUMMARY OF THE INVENTION

The present invention provides a screeding machine that is operable to screed concrete that is disposed within forms or framework for forming a tilt-up concrete panel (or other concrete slabs or structure formed within and defined by form boards or framework) that, after the concrete is screeded and cured, is raised to a vertical orientation for use as part of a wall of a building. The screeding machine includes a base unit and a screed head that is extendable and retractable relative to the base unit, such as via a multi-stage telescoping boom or other suitable extension/retraction mechanism, and that is raisable and lowerable relative to the end of the extension/retraction mechanism via elevation cylinders or actuators. The screeding machine includes a control system that switches between a float mode when the screed head is at and on a form or frame portion of the framework and a sensor control mode when the screed head is not at a form or frame portion of the framework and is screeding the concrete responsive to signals from the sensors (e.g., laser receivers or other suitable sensors that are used to determine the position of the screed head) of the elevation cylinders. The elevation cylinders comprise reduced friction seals to allow for enhanced floating of the screed head when in the float mode and the elevation cylinders provide reduced downward creep of the screed head when the cylinders are not being actively pressurized to raise or lower the screed head. The screeding machine includes adjustable wings that are adjustably positioned at the grade establishing member and movable along the grade establishing member (via respective actuators) so the wings are positioned at the forms of the framework when the screed head is at the forms or frame portions to limit excess concrete from flowing along the grade establishing member and over the framework. The screeding machine also includes an active or dynamically adjustable counterweight that is automatically moved in a direction parallel to the axis of the boom responsive to the degree of extension of the boom and screed head.

These and other objects, advantages, purposes and features of the present invention will become apparent upon review of the following specification in conjunction with the drawings.

DESCRIPTION OF THE PREFERRED EMBODIMENTS

Figure 1:
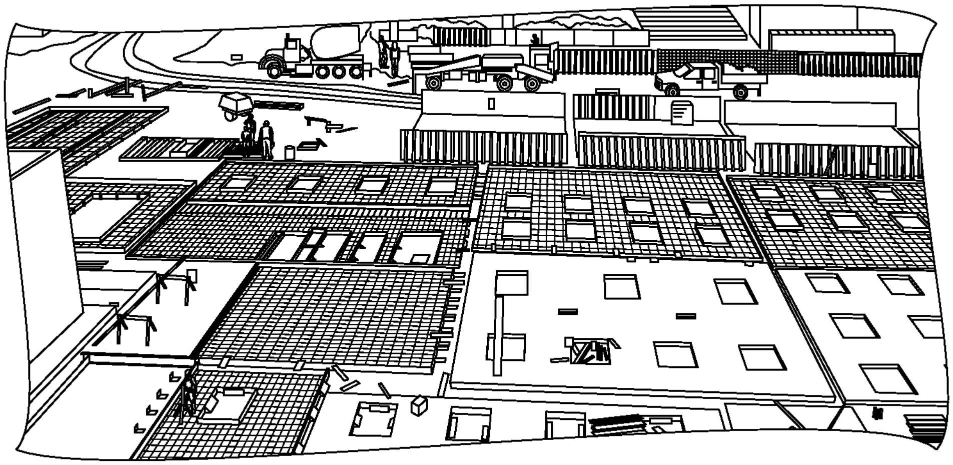
FIGS. 1-4 are perspective views showing conventional tilt-up panels and the processes in forming the tilt-up panels.
Figure 2:
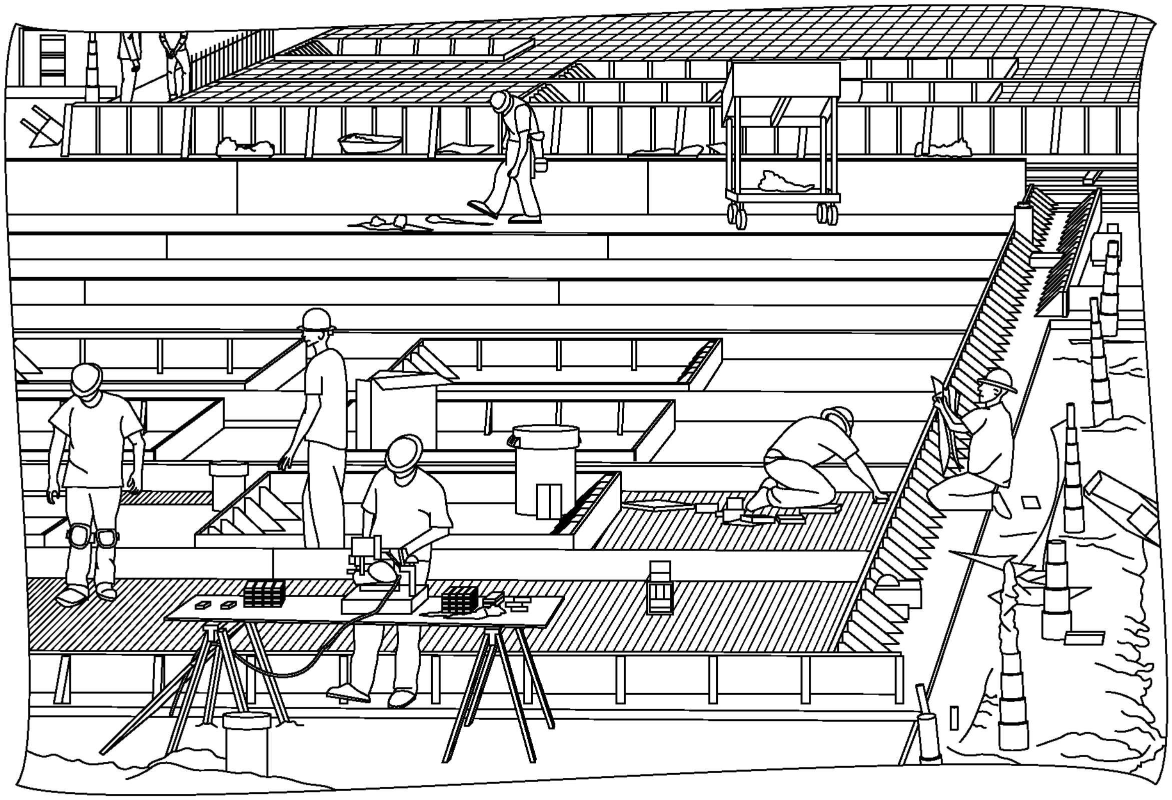
Figure 3:
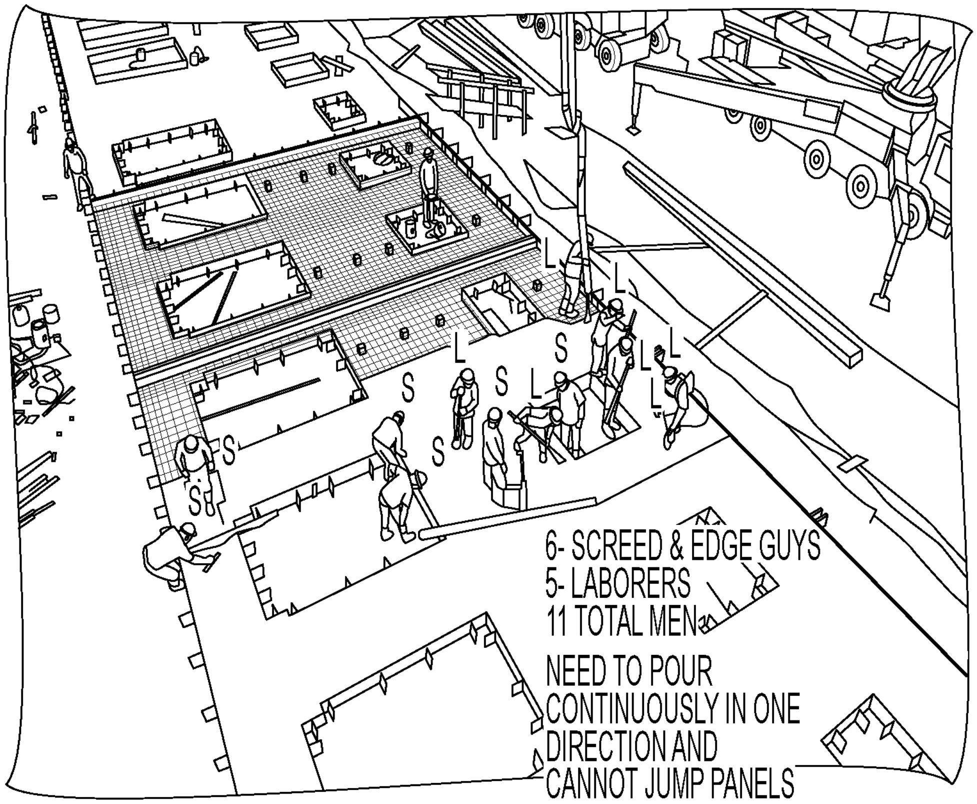
Figure 4:
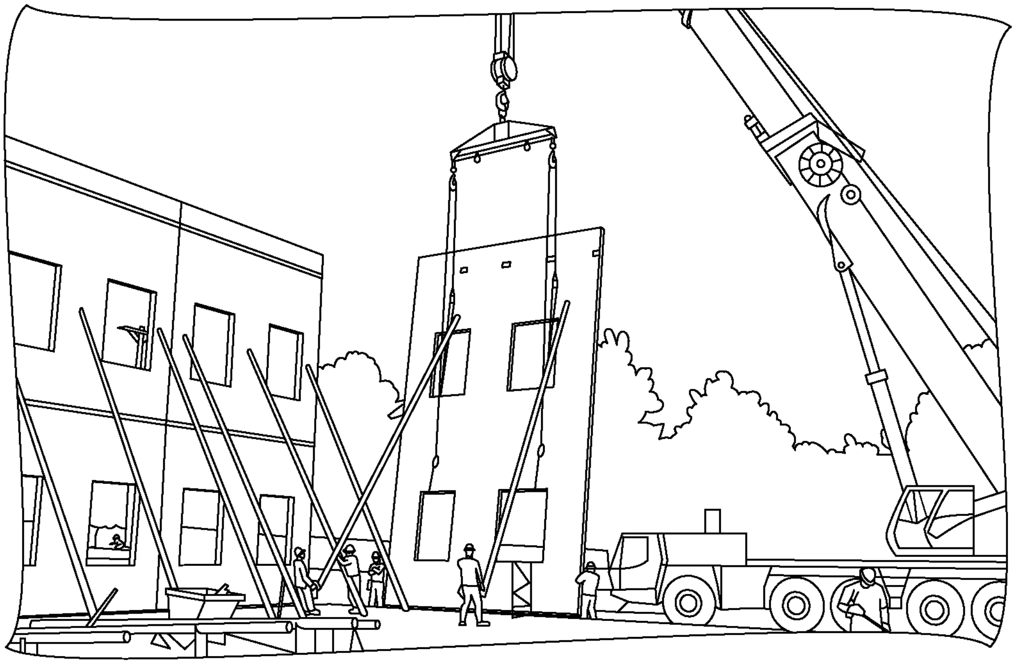
Figure 5:
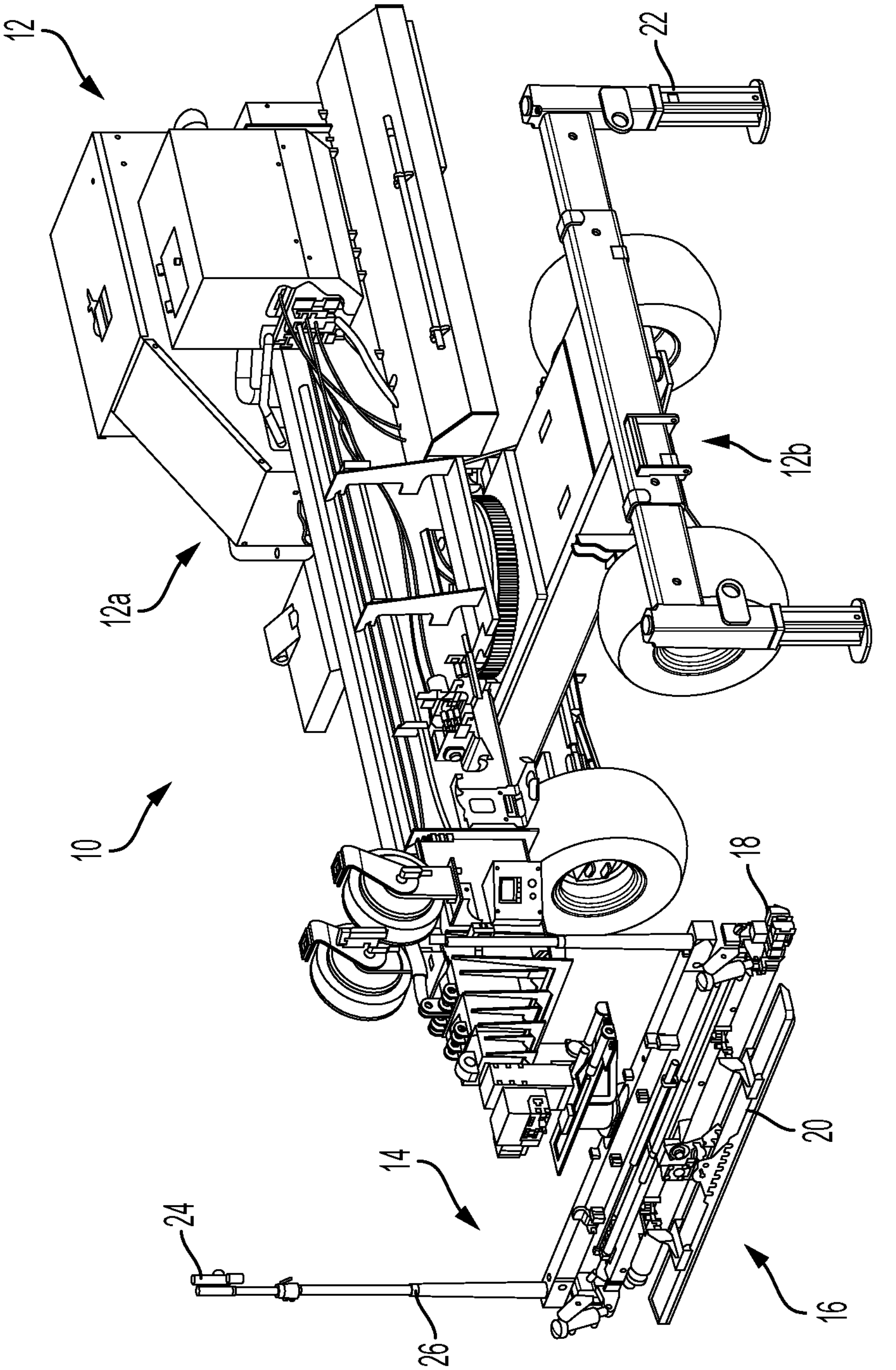
FIG. 5 is a perspective view of a concrete leveling and screeding machine.

Referring now to the drawings and the illustrative embodiments depicted therein, a concrete leveling and screeding machine 10 includes a base unit 12 with an extendable and retractable support or mechanism, such as a boom 14 extending from the base unit and supporting a screeding head or assembly 16 at an outer end thereof (FIG. 5). The base unit 12 is movable or drivable to a targeted area at a support surface with uncured concrete placed thereat, and the base unit may include an upper portion 12*a* that rotates or pivots about a base portion 12*b* to swing the boom and screeding head to a targeted location. The base portion 12*b* includes a plurality of wheels (e.g., four wheels) that are rotatably drivable and steerable to maneuver the base unit 12 to an appropriate screeding position relative to the concrete panel to be screeded.

When the machine is positioned at the screeding position (e.g., at a side region of the framework for forming a tilt-up concrete panel or other concrete slab or structure formed within and defined by form boards or framework), the boom 14 is extendable to move the screeding head 16 over the placed, uncured concrete to a starting position. The boom is then retracted to pull the screeding head toward the base unit, while the screeding head 16 operates to establish a desired grade of the concrete surface and smooth or finish or screed the concrete. In the illustrated embodiment, the screeding head includes a grade setting device 18 (such as a roller plow or vibrating plow and/or auger) and a vibrating member 20. The screeding machine includes a plurality of stabilizers 22, which may be extendable and retractable relative to the base portion 12, to support and stabilize the machine on the support surface during the screeding operation. The controller of the screeding machine individually controls the elevation cylinders 26 of the screed head to raise and lower the screed head responsive to signals generated by sensors of the machine, such as, for example, responsive to signals generated by laser receivers 24, which sense a laser reference plane generated at the work site, or such as, for example, 3D target/sonic tracers or any suitable sensor or sensing system that operates to generate an output indicative of the grade or angle or location of the screed head at the concrete.

The screeding machine comprises a pressurized hydraulic fluid system powered by an engine at the base unit that drives the hydraulic system to generate pressurized fluid for controlling the elevation actuators or cylinders 26 and stabilizers 22 and for rotating the upper base portion 12*a* relative to the lower base portion 12*b* and for controlling the extension and retraction mechanism (such as the telescoping boom or articulating arm or any other suitable mechanism that operates to extend and retract while supporting the screed head) and for driving and steering of the wheels of the base unit. The screeding machine 10 and the screeding head or assembly 16 may utilize aspects of the screeding machines and screeding heads described in U.S. Pat. Nos. 4,655,633; 4,930,935; 6,227,761; 6,976,805; 7,044,681; 7,121,762; 7,175,363; 7,195,423; 7,396,186; 7,850,396; 8,038,366; 9,835,610; 10,190,268 and/or 10,895,045, and/or U.S. Publication Nos. US-2010-0196096 and/or US-2007-0116520, which are all hereby incorporated herein by reference in their entireties.

The screeding machine 10 is suitable for use in screeding concrete placed within an area defined by forms or framework for forming tilt-up wall panels. Typically, such tilt-up panels are formed by arranging wooden forms or frames at a support surface that form or shape the perimeter of the panel and that form or shape windows or other openings that are to be present through the panel after the panel is formed, with such frames or forms comprising 2×10 or 2×12 (or other suitable size) wooden form boards or beams that are cut and supported on edge at the support surface to form or define the shape of the tilt-up panel and openings. In forming the tilt-up wall panels, operators will often screed the floor of a building first or create a slab to arrange the framework on and to pour the concrete for the panels on, and then the operators form the individual wall panels which are poured, cured and lifted in place with a crane. Such tilt-up panels are typically screeded by hand or small hand-controlled vibrator screeds (see FIGS. 1-4).

Figure 10:
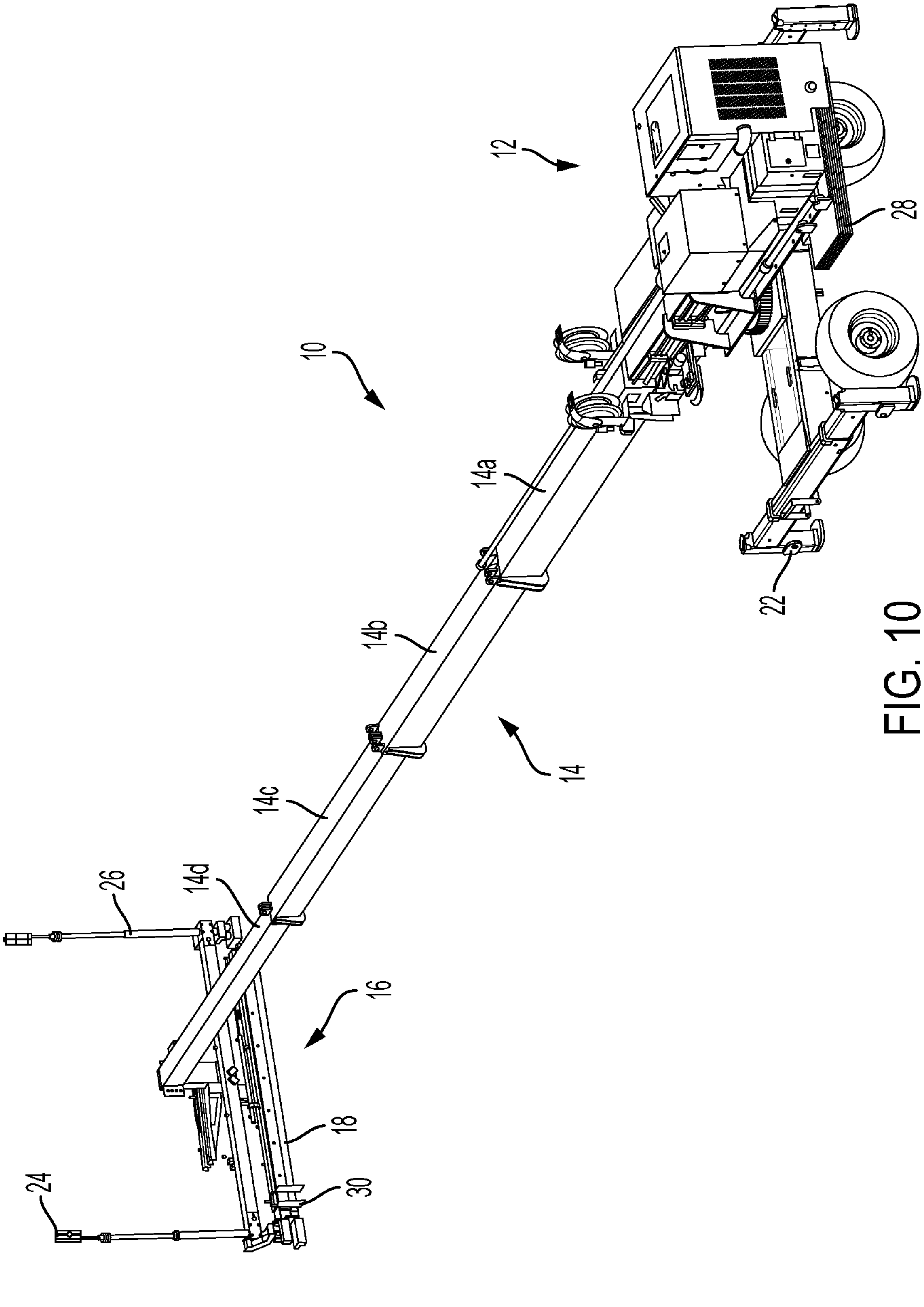
FIG. 10 is another perspective view of the concrete leveling and screeding machine, shown with the screed head and boom extended, with the dynamic counterweight moved in a direction opposite the boom extension direction.

The screeding machine 10 is operable to screed the tilt up panels, thereby reducing the time to screed the tilt-up panels and reducing the number of laborers required to form the tilt-up panels. Because of the presence of the side framework, the screeding machine cannot be driven into the panel area. Thus, the extension and retraction mechanism or boom 14 of the screeding machine 10 is extendable to move the screed head substantially out over the placed concrete to screed the concrete panels while they are flat or horizontal on the ground or support surface. In the illustrated embodiment, the boom comprises a four stage boom (having four telescoping sections 14*a*-*d*, as best shown in FIG. 10) and is extendable to move the screed head about 50 feet from the base unit so that the screed head 16 can reach well into the panel area.

As the screed head 16 is moved toward the base portion 12 in the screeding direction via retraction of the boom 14, the vibrating member or floating vibrator 20 floats behind the grade establishing member or grade setting device or roller plow or vibrating plow 18. The grade establishing member may comprise any suitable plow or grader or member. For example, the grade establishing member may comprise a generally sharp edge or may comprise a rounded surface or chamfered edge or non-sharp edge (unlike a conventional or knife edge plow for a screed head) to avoid digging into the form board when the machine is operating in the float mode. Thus, the grade establishing member may comprise a rotating or spinning roller plow (rotatably driven via a hydraulically driven motor controlled by the controller of the machine) or a vibrating plow (e.g., a 2 inch or 4 inch wide vibrating plow that is vibrated or oscillated via a hydraulically driven motor), which provides a larger concrete engaging surface area, and which prevents the grade establishing member from digging into the form board due to the weight, and which may generate cream near the form board to leave an enhanced appearance of the finished concrete near the form board. Optionally, the vibrator 20 may include a flexible trailing edge or portion that can flex downward into the concrete transferring more vibration into the concrete. The flexible trailing edge may have fingers or ribs to allow for flexibility of the trailing edge portion while maintaining enough strength to transfer the vibration into the concrete. The screed head may comprise any suitable length grade establishing member and vibrator, such as, for example, an eight foot grade establishing member and/or vibrator or the like.

The screed head 16 is pivotally mounted at the outer end of the boom 14 and can rotate about a vertical axis relative to the horizontally extending boom to allow for adjustment of the screed head as the screed head is moved over and along the concrete surface. In the illustrated embodiment, the screed head can rotate about 150 degrees about the vertical axis at the end of the boom.

The screeding machine 10 may comprise a remotely controlled machine (i.e., no operator station on the base of the machine), such that an operator can control the extension and retraction of the boom and the rotation of the screed head and the elevation of the screed head and actuation of the roller plow and vibrator, etc., via a remote control device separate and remote from the machine. The remote control device may wirelessly communicate with a controller or control system of the machine via any suitable means, such as radio communication or other wireless communications.

The remote control may also include remote control of the base unit to drive and steer the wheels (such as four wheel steering, two wheel steering and/or crab steering or the like) of the base unit to position the machine at a screeding location. The stabilizers 22 may vertically extend and retract to support the machine at the desired screeding location, and may extend horizontally outward from the machine to provide a larger stabilization footprint for the machine. This is helpful due to the substantial distance the four-stage boom 14 can extend from the base unit 12.

Figure 9:
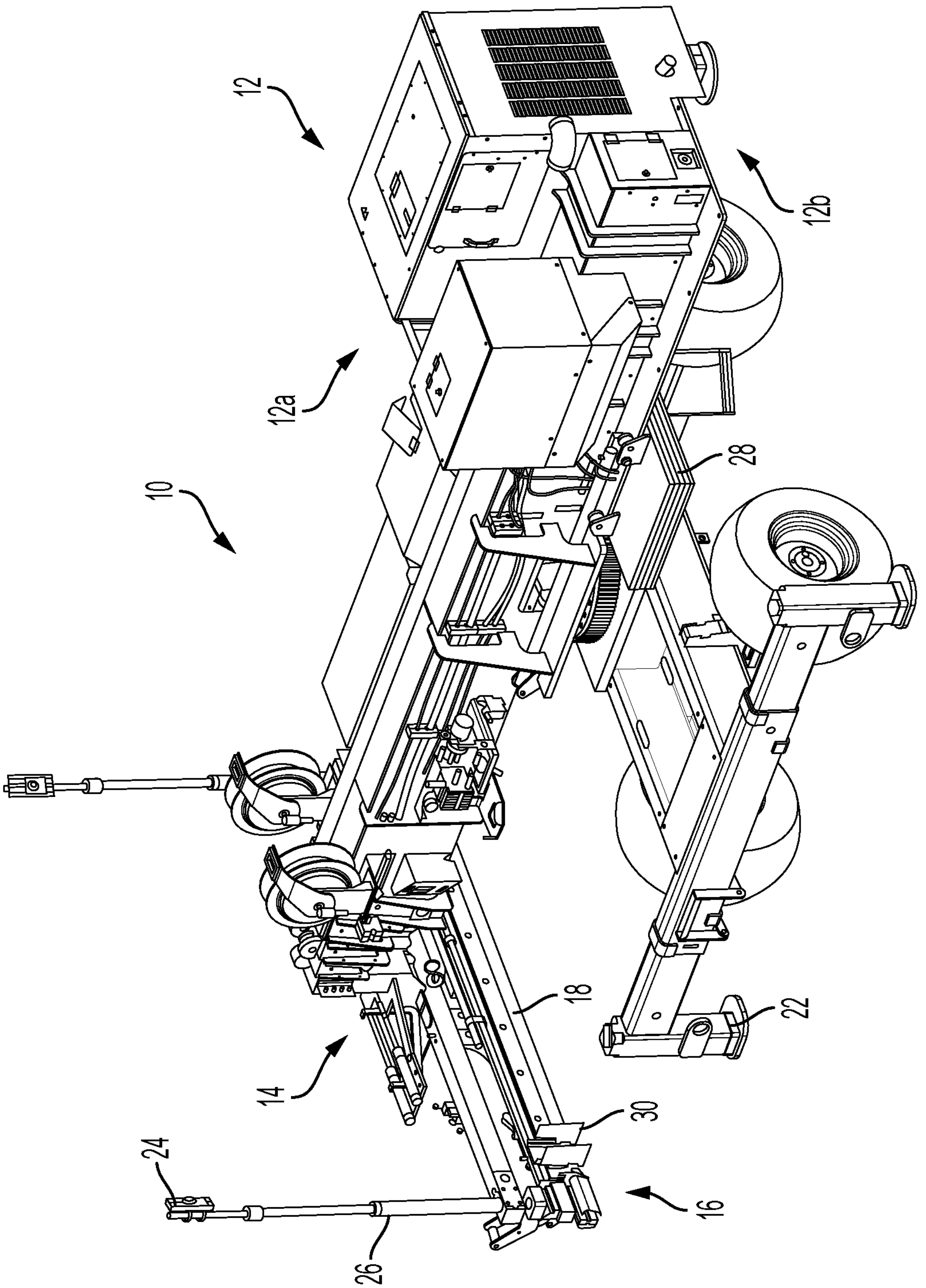
FIG. 9 is another perspective view of the concrete leveling and screeding machine, shown with the screed head and boom retracted, with the dynamic counterweight moved toward the boom.

In addition, the pivotable or rotatable upper portion 12*a* of the base unit 12 includes a dynamically adjustable or active counterweight 28 that moves in the opposite direction of the screed head 16 as the boom 14 extends/retracts. For example, and such as can be seen with reference to FIGS. 9 and 10, as the boom 14 extends and thus moves the screed head 16 away from the base unit 12 in one direction, the counterweight 28 moves in the opposite direction as the extension of the boom to balance the machine as the screed head moves further away from the base unit. The counterweight moves automatically responsive to extension/retraction of the boom and moves in a distance that is proportional to the distance that the boom extends.

The counterweight may move responsive to a position sensor or linear movement sensor (that senses extension/retraction of the boom) or responsive to a moment or torque sensor (that senses the torque at the base unit caused by the extension of the boom) or any suitable sensing means (that generates a signal or output that is representative of the degree of extension of the boom and/or position of the screed head relative to the base unit), such that the counterweight is automatically moved an appropriate amount as the boom 14 extends and retracts to move the screed head 16. Thus, the machine provides a large counterweight 28 that moves outward from the base unit 12 (away from the screed head) when the boom and screed head are extended out for better balance and that moves inward toward the base unit 12 (toward the screed head) when the boom and screed head are retracted so the machine does not get rear heavy.

Figure 6:
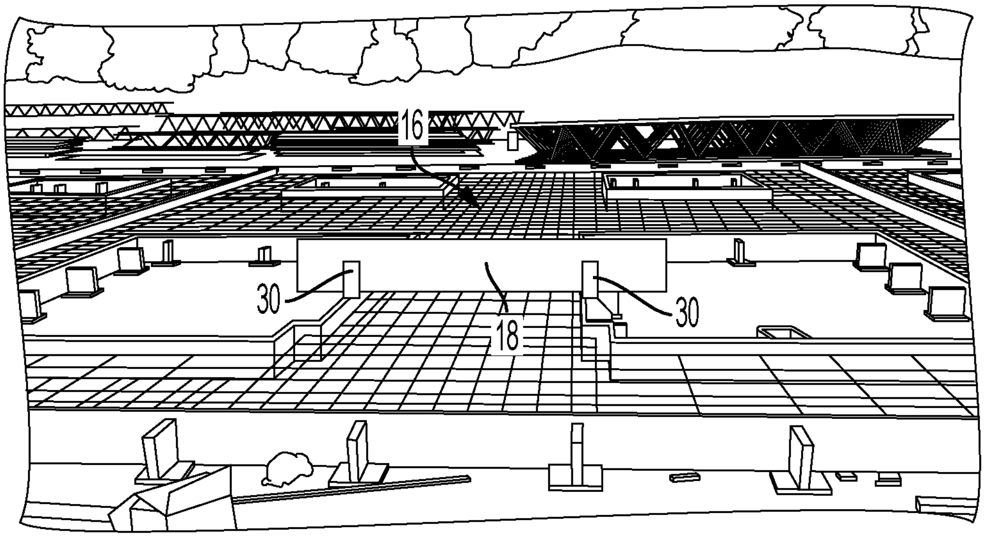
FIG. 6 is a perspective view and block diagram of the screed head of the screeding machine, with the plow wings adjusted to correspond with the window forms of the tilt-up panel framework.
Figure 7:
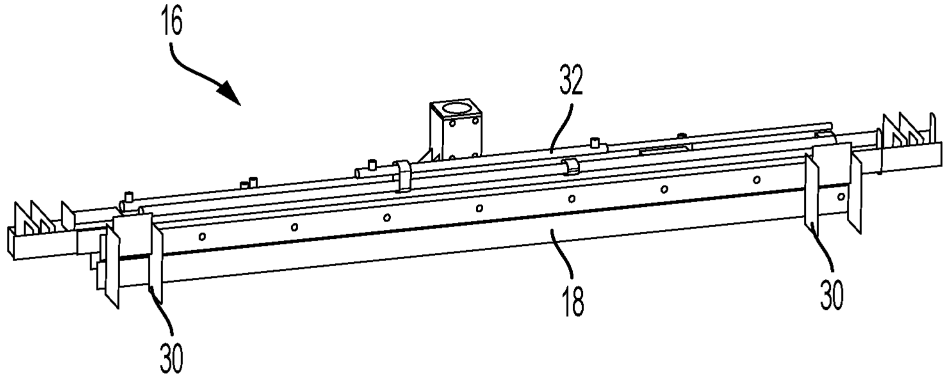
FIGS. 7 and 8 are perspective views of the screed head, showing the plow wings at an outer end of the screed head (FIG. 7) and showing the plow wings adjusted inward to adapt the screed head for the window forms (FIG. 8)
Figure 8:
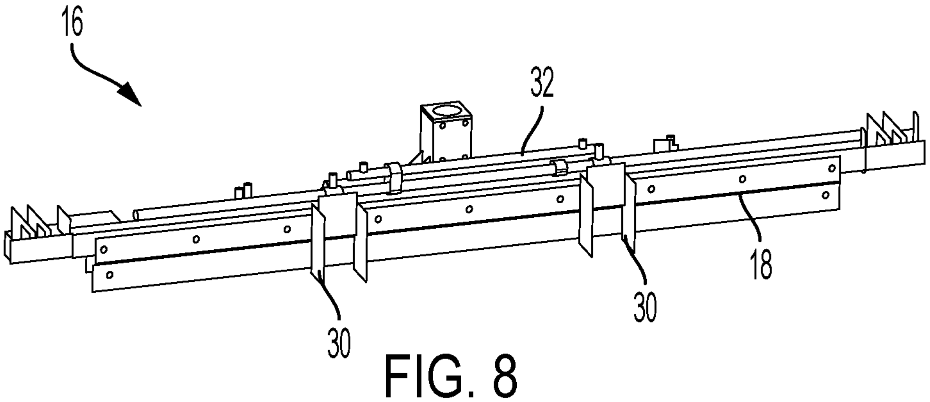

As shown in FIGS. 6-8, the screed head 16 includes adjustable plow wings 30 that are adjustably positioned at the grade establishing member or plow (e.g., the roller plow or vibratable plow or other suitable grade establishing member or device) and that are adjustable along the grade establishing member. The plow wings 30 function to limit excess concrete that is pushed by the grade establishing member from flowing around the ends of the grade establishing member 18, in order to avoid the excess concrete from flowing onto an already screeded portion of the panel. The plow wings 30 are adjustable along the grade establishing member 18 to limit the excess concrete at different locations and/or widths along the grade establishing member. As can be seen with reference to FIGS. 7 and 8, the plow wings may be positioned at outer opposite ends of the grade establishing member (FIG. 7) and may be adjustable or movable inward toward one another (either individually movable or movable in tandem) to contain the excess concrete ahead of the grade establishing member within a smaller or reduced portion (see FIG. 8) of the overall length of the grade establishing member 18.

In the illustrated embodiment, each plow wing 30 is independently movable along the grade establishing member 18 via a respective actuator 32 that extends to move the plow wing toward the outer end of the grade establishing member and retracts to draw or move the plow wing toward the center of the grade establishing member. The plow wings 30 may be slidably disposed at the grade establishing member and may slide along the forward surface of the grade establishing member 18 (the surface facing the boom and base unit), such as via sliding elements and tracks that allow for horizontal movement of the plow wings along the grade establishing member in the direction along or across the grade establishing member, while limiting or precluding movement of the plow wings vertically with respect to the grade establishing member and while limiting or precluding rotation or pivoting of the plow wings relative to the grade establishing member.

Thus, the plow wings 30 are adjustable so that the operator can adjust the effective width of the grade establishing member and screed head while screeding the concrete of the tilt-up panel. For example, when the screeding machine and screed head is screeding the concrete where there are no window forms present, the plow wings can be moved toward and to the ends of the grade establishing member to provide an effective width of the screed head 16 corresponding substantially to the width of the grade establishing member 18. When one or both ends of the grade establishing member 18 and screed head is/are resting on a form (such as the forms or frames that form or establish windows through the formed tilt-up panel), the plow wing or wings can be moved inward so that the plow wings are positioned at the respective wooden form or frame portion (see FIG. 6) to limit or preclude excess concrete from flowing over the forms or frames and into the window space (and onto the already screeded and cured floor or support surface at which the tilt-up panel is being formed).

The actuators 32 may be independently and/or jointly operated by the operator (such as by using the remote controller for the machine) to position each wing 30 at the appropriate location along the grade establishing member 18. Optionally, the actuators 32 may automatically operate to move the plow wings 30 to be positioned at a frame or form, such as responsive to determination of the presence of a frame or form at or near the screed head 18, such as via a map input of the layout of the tilt-up panel and forms or such as responsive to a sensor that senses presence (or lack of presence) of a frame or form as the screed head 16 moves along and over the poured concrete. Thus, as the screed head 16 is moved over and along the concrete surface where no window frames are present, the operator and/or controller, via the actuator 32, may move the plow wings 30 to the respective ends of the grade establishing member 18, and as the screed head 16 is moved to the location where one or both ends of the grade establishing member and screed head are positioned over a respective window frame or form (or other frame or form for use in forming the tilt-up panel), the actuator may move the respective wing or wings inward to position them at and on top of the respective frame or form. After the screed head 16 has moved past the window frame or form, the actuator 32 may move the wing or wings 30 back toward or to the respective end of the grade establishing member 18 as the screed head continues screeding the concrete panel.

Because the screed head 16 may be moved from locations where the forms or framework are present to locations where no forms or framework is present, the operation of the screeding machine may be adjusted to adapt for the changes in the type of screeding that is desired for the different locations. The screeding machine 10 thus may adjust the operating mode when the screed head is moved from screeding concrete at a location where there are no frames or forms present to a location where a frame or form is at one or both of the ends of the screed head. For example, when the screed head 16 is screeding concrete where no forms are present, the system may operate in a sensor control mode, where the screed head is raised and lowered responsive to signals from the grade sensors 24 (e.g., laser receivers) to maintain the screed head 16 at the desired or appropriate or set grade. When the screed head 16 is moved to a location where forms or frames are present, the machine can switch to a float mode where the sensor control is turned off and the screed is allowed to float or rest on the forms or frames as the screed head is moved along to screed the concrete.

Each end of the screed head 16 may independently switch between sensor control mode and float mode so that one end of the screed head may be controlled responsive to the respective sensor 24, while the other end of the screed head may float or rest on the frame or form. Thus, the operator can select to have one end of the screed head float on the frame (and can adjust the plow wing to be positioned at the frame) and have the other end of the screed head be under sensor control (and can adjust the plow wing to be positioned at that end of the grade establishing member).

The screeding machine may also automatically switch between the float mode and the sensor control mode based on the location of the screed head relative to the forms or frames. For example, the screeding machine may automatically switch to the sensor control mode if the screed head 16 drops a threshold amount, such as when the screed head moves (while in float mode) along and off of a form or frame, in order to correct when an operator may forget to switch the system to the sensor control mode at the end of the window form. Optionally, the system and machine may automatically switch between the float mode and the sensor control mode responsive to detection (such as via any suitable sensor, such as an imaging sensor or a concrete sensor or hardness sensor or the like) of presence (or lack of presence) of a form at and below the screed head 16 as the screed head moves over and along the poured concrete.

Figure 11A:
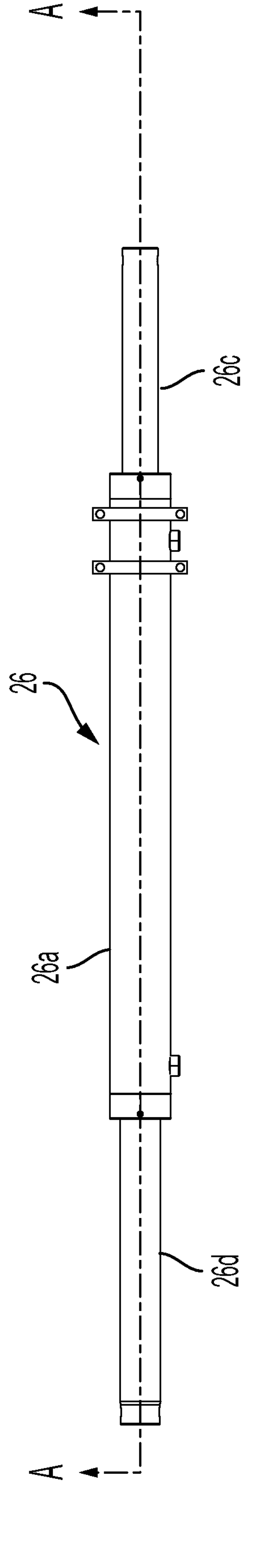
FIG. 11A is a sectional view of the screed head elevation cylinder, taken along the line A-A in FIG. 11.
Figure 11B:
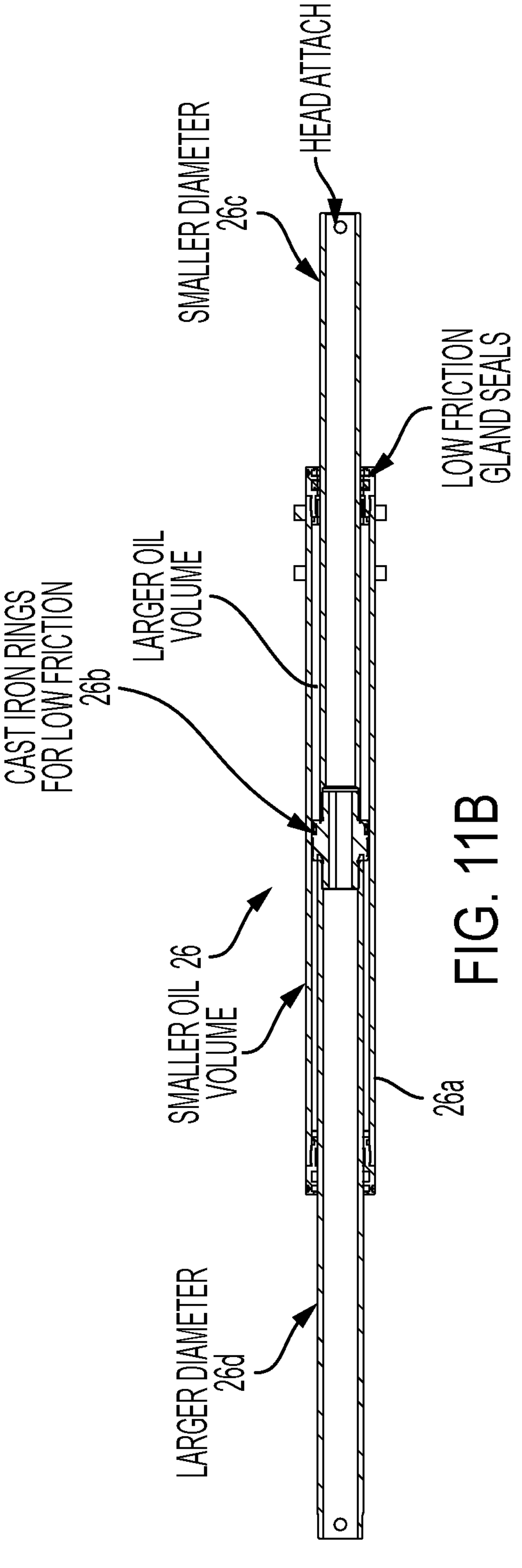
FIG. 11 is a side elevation of a screed head elevation cylinder of the screeding machine having a larger diameter upper rod or post and a smaller diameter lower rod or post.

The elevation actuators or cylinders 26 thus may be selectively pressurized responsive to signals from the sensors (e.g., laser receivers) when the screeding machine is operating in the sensor control mode, and may be depressurized (via stopping supply of pressurized fluid and opening the cylinder ports to the zero pressure reservoir circuit) so that the cylinder allows for adjustment in either direction (up or down) of the respective end of the screed head as the screed head is positioned at and allowed to rest on and move along the respective frame. As shown in FIGS. 11 and 11A, the elevation cylinder includes a central cylinder 26*a* having a center piston element 26*b* that connects at one end to a smaller diameter lower rod or post 26*c* and at the other end to a larger diameter upper rod or post 26*d*. The screed head is attached at the lower end of the smaller diameter rod 26*c*, while the laser receiver is attached at the upper end of the larger diameter rod 26*d*. The center piston element 26*b* has low friction sealing rings, such as cast iron rings for reduced friction at the inner wall surface of the central cylinder 26*a* as the piston element (and the laser receiver and the end of the screed head) moves relative to the central cylinder 26*a* (such as when one of the chambers above or below the piston and defined by the inner wall surface of the cylinder and the respective rod is pressurized). The seals at the ends of the cylinder also comprise low friction "unloaded" gland seals to reduce friction at the respective rod as the rods are moved relative to the cylinder.

By providing different diameter upper and lower rods (and thus different volume chambers of the central cylinder above and below the piston element), lower friction cast iron sealing rings can be used, even though such rings may allow for fluid leakage between the chambers in the central cylinder. The cast iron piston rings provide for low friction performance when the system is operating in the float mode, but since they will leak oil past the rings, a dual rod cylinder with equal diameter rods would creep downward as the machine sits unused (even if the cylinder ports are capped) due to the weight of the screed head pulling on the lower rod. Providing upper and lower rods having different diameters precludes the rods from creeping downward when the position of the screed head is locked, such as when sitting unused.

The upper rod 26*d* has a larger diameter than the lower rod 26*c* so as to provide a chamber having a smaller volume of hydraulic oil or fluid above the piston than the larger volume of oil (due to the smaller diameter lower rod) below the piston. Thus, when both chambers contain oil, such as when the vertical position of the screed head is locked, the load of the screed head attached at the lower end of the smaller diameter rod 26*c* pulls the rod downward. This downward force thus tries to force oil from the larger volume lower chamber into the smaller volume upper chamber. However, in order for the oil to be pushed from the larger volume chamber into the smaller volume chamber, the oil would have to be compressed. The weight of the screed head is not significant enough to cause compression of the oil to the extent necessary to allow measureable or noticeable creep. Thus, the larger diameter upper rod 26*d* (and therefore smaller upper chamber) and smaller diameter lower rod 26*c* (and therefore larger lower chamber) resist the creep phenomenon due to the inherent incompressible nature of the hydraulic oil or fluid filling the chambers.

Figure 12A:
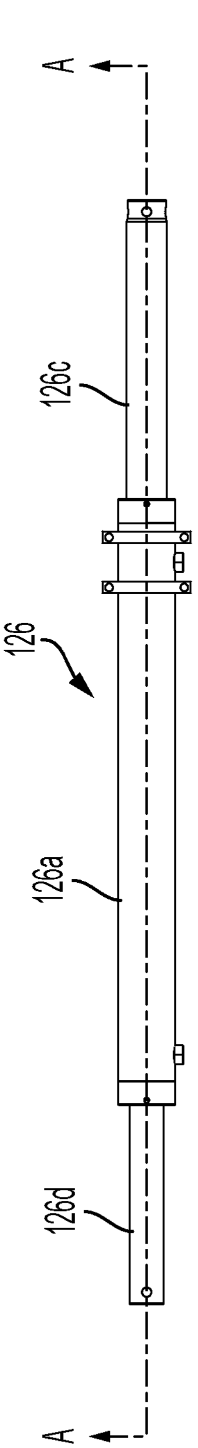
FIG. 12A is a sectional view of the screed head elevation cylinder, taken along the line A-A in FIG. 12.
Figure 12B:
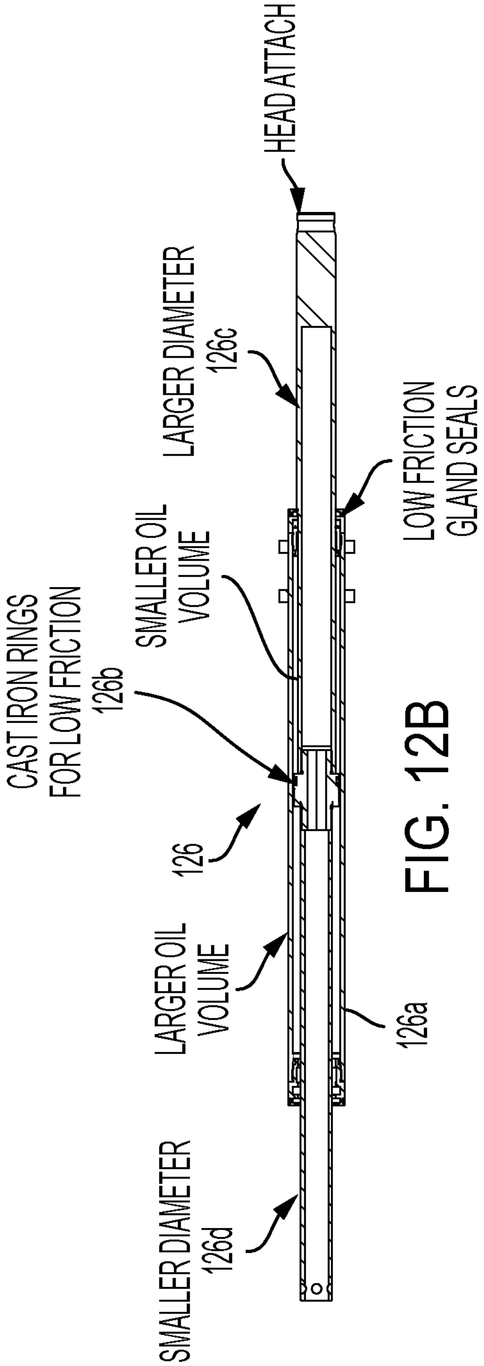
FIG. 12 is a side elevation of a screed head elevation cylinder of a screeding machine having a smaller diameter upper rod or post and a larger diameter lower rod or post.

Optionally, and as shown in FIGS. 12 and 12A, the elevation actuator 126 includes a central cylinder 126*a* that receives an upper rod 126*d* having a smaller diameter than the lower rod 126*c* in order to create a larger oil volume in the chamber above the piston 126*b* than in the chamber below the piston. Therefore, as gravity tries to pull the lower rod 126*c* downward, the lower chamber needs to displace a smaller volume of oil over to the upper chamber which is a larger volume chamber. This creates a vacuum in the upper chamber that resists the creep phenomenon. In the opposite direction, a larger volume of fluid cannot be forced into the smaller volume chamber.

Thus, when the system operates in the float mode, the pressurized fluid is not provided to either chamber and the ports are closed to pressurized fluid and opened to the zero pressure reservoir circuit so that the piston element and the rods move relative to the cylinder, with the lower friction rings and seals allowing for low friction movement of the rods (and the screed head) relative to the cylinder. In other words, pressurized fluid is not provided to the float circuit so that the screed head may rest or float on the forms. When operating in the sensor control mode, pressurized fluid is provided at one chamber (to raise or lower the sensor or laser receiver and respective screed head end) and the different volume chambers function to hold the rods at a set location relative to the cylinder when additional hydraulic fluid is not being provided to either chamber. The elevation cylinders thus provide for a reduced friction float mode while also providing sensor control of the actuators and a locking or non-creeping function.

Figure 13:
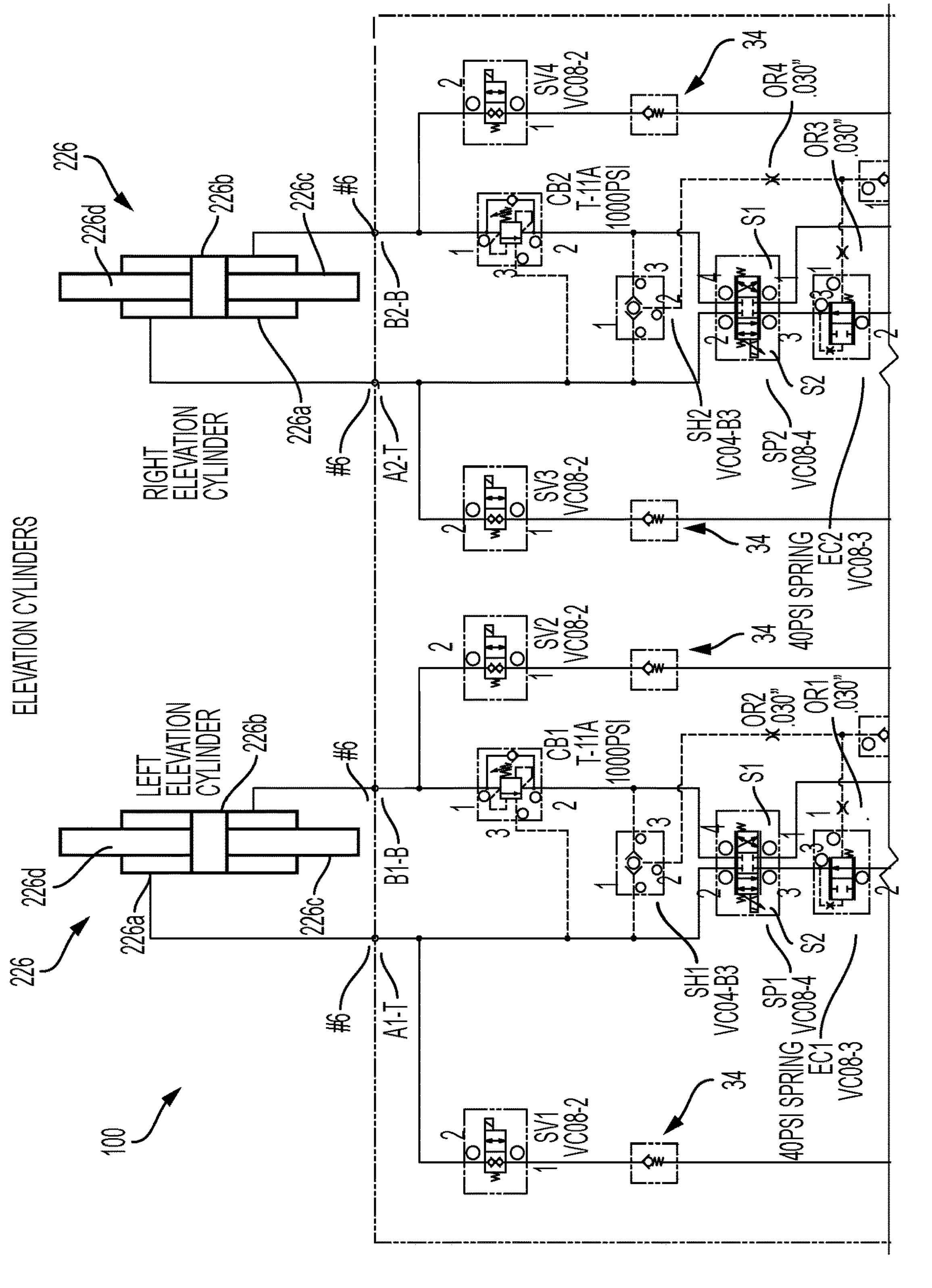
FIG. 13 is a schematic diagram of a hydraulic float circuit for screed head elevation cylinders.

Optionally, when in the float mode, the elevation actuators may be at least partially pressurized, so as to ensure that the bottom of the screed head remains in contact with the top of the form. This may be achieved by providing a minimal level of pressure in the upper chamber or a minimal pressure difference between the upper chamber and the lower chamber. Thus, pressure may be maintained in the upper chamber to provide a minimal or threshold level of downward force. This can be achieved via a check valve in the float circuits. For example, FIG. 13 depicts a schematic diagram of a hydraulic float circuit 100 showing the flow of pressurized fluid for operating the hydraulic elevation actuators 226, each including a hydraulic cylinder 226*a* having a piston element 226*b*, a lower rod 226*c* in a lower chamber, and an upper rod 226*d* in an upper chamber. The hydraulic lines to the solenoids that control pressurization of the respective cylinder chamber or portion are in fluid communication with a hydraulic pump or pressurized fluid source, while the hydraulic lines to the solenoids that allow flow of fluid from the respective cylinder chamber or portion (when the other cylinder chamber or portion is pressurized) are in fluid communication with a fluid reservoir (which is in fluid communication with the hydraulic pump).

As shown in FIG. 13, the pressurized fluid flows to and from the lower chamber and the upper chamber, where a check valve 34 is disposed in each of the flow paths of the lower chamber and the upper chamber. The check valve 34 includes a spring that provides a given amount of backpressure, thus providing the minimal levels of pressure in the chambers, such as at least a set amount of pressure in the circuit for the upper chamber. For example, with a check valve with a 15 psi spring in the float circuit, the upper chamber may always have at least 15 psi of pressure so long as the float circuit is supplied with oil via a control valve of the circuit and the valve is opened.

Thus, the system may switch between the float mode and the sensor control mode on the fly. When one side of the screed head is resting on the form board, the operator can flip the sensor control off (to depressurize the elevation cylinder) for that end or side or actuator and let that end or side of the screed head float down to ride on the form board, while the other actuator continues to operate in the sensor control mode. If, when operating in the float mode, the form board is too low or if the screed head drops too far (e.g., up to or more than ⅛ inch or ¼ inch or ¾ inch) the system can automatically switch that actuator (or both actuators) back to the sensor control mode. Thus, if the operator is slow to switch back to sensor control when the screed head gets to the end of the window form and the head starts to sink in the concrete, the system automatically switches back to sensor control mode to avoid further sinking of the screed head at the concrete.

Therefore, the system or machine or method for screeding uncured concrete for a tilt-up panel includes a screeding machine comprising a screed head assembly, a pair of elevation sensors disposed at opposite ends of the screed head assembly, and a control. The screed head assembly is moved over the concrete surface via the screeding machine to screed the concrete surface. The elevation sensors or laser receivers sense an elevation of the respective end of the screed head assembly relative to a laser-generated reference plane established above the tilt-up panel, and the elevation cylinders operate to adjust the height of the screed head responsive to the laser signal received by the laser receivers to screed the concrete of the tilt-up panel at the appropriate grade. Although shown and described as having the elevation actuators or cylinders disposed at and attached at the ends of the screed head, the screeding machine may include other types of elevation actuators, such as actuators or cylinders disposed at the extendable and retractable mechanism or boom or disposed at the base unit or the like. The screeding machine may operate in a float mode when the screed head is positioned at the frame or form, and may operate in a sensor control mode when the screed head is screeding concrete at locations where the frame or form is not present. The elevation cylinders comprise low friction seals to allow for floating of the screed head at the forms, and the elevation cylinders limit creep due to gravity. The screed head includes adjustable plow wings that are moved along the grade establishing member of the screed head to be positioned over the frame or form of the tilt-up panel.

Changes and modifications to the specifically described embodiments can be carried out without departing from the principles of the present invention, which is intended to be limited only by the scope of the appended claims as interpreted according to the principles of patent law.

The invention claimed is:

1. A screeding machine for screeding uncured concrete placed within framework to form a concrete structure, the screeding machine comprising:

a base unit positionable at framework that defines the concrete structure to be formed;

a screed head assembly movably mounted at the base unit via an extendable and retractable mechanism, wherein the screed head assembly comprises (i) a grade establishing member, (ii) a vibrating member, and (iii) adjustable wings disposed at and in front of the grade establishing member in a screeding direction, and wherein the adjustable wings are movable along the grade establishing member via respective actuators;

elevation actuators operable to adjust elevation of the screed head assembly responsive at least in part to elevation sensors that sense elevation of respective ends of the screed head assembly;

a control system, wherein the control system, responsive to signals from the elevation sensors, controls the elevation actuators to set the grade of the uncured concrete;

wherein the screed head assembly is positionable at a screeding location within the framework via extension of the extendable and retractable mechanism and is movable over the uncured concrete in the screeding direction from the screeding location via retraction of the extendable and retractable mechanism;

wherein, when one of the ends of the screed head assembly is positioned at a frame portion that defines part of the concrete structure being formed, the wing at that end of the screed head assembly is moved via actuation of the respective actuator to position the wing at the frame portion to limit excess concrete in front of the grade establishing member in the screeding direction from flowing over the frame portion when the screed head assembly is moved in the screeding direction; and wherein the control system operates in a float mode when the screed head assembly is positioned at the frame portion and operates in a sensor control mode when the screed head assembly is positioned at a location where no frame portion is present.

2. The screeding machine of claim 1, wherein the screeding machine comprises a wheeled unit.

3. The screeding machine of claim 1, wherein the elevation sensors comprise laser receivers disposed at respective elevation actuators disposed at the screed head assembly for sensing an elevation of the respective end of the screed head assembly relative to a laser generated reference plane established at the framework.

4. The screeding machine of claim 1, wherein the actuators of the wings are actuated via a user actuatable input.

5. The screeding machine of claim 1, wherein, with the control system operating in the float mode when the screed head assembly is positioned at the frame portion, the elevation actuators do not adjust elevation of the screed head assembly responsive to the elevation sensors, and wherein, with the control system operating in the sensor control mode when the screed head assembly is positioned at a location where no frame portion is present, the elevation actuators adjust elevation of the screed head assembly responsive at least in part to the elevation sensors.

6. The screeding machine of claim 1, wherein the control system automatically switches from the float mode to the sensor control mode responsive to a drop of the screed head assembly by a threshold amount.

7. The screeding machine of claim 1, wherein the elevation actuators are disposed at the screed head assembly, and wherein each elevation actuator comprises (i) a double ended hydraulic cylinder having a lower rod having a first diameter and an upper rod having a second diameter different from the first diameter and (ii) a piston element disposed within the hydraulic cylinder, and wherein the lower rod extends from the piston element through a lower chamber of the hydraulic cylinder and the upper rod extends from the piston element through an upper chamber of the hydraulic cylinder.

8. The screeding machine of claim 7, wherein the first diameter is smaller than the second diameter.

9. The screeding machine of claim 7, wherein the first diameter is larger than the second diameter.

10. The screeding machine of claim 7, wherein, when operating in the float mode, the lower chamber and the upper chamber are not pressurized to allow the screed head assembly to move upward and downward relative to the hydraulic cylinder.

11. The screeding machine of claim 7, wherein, when operating in the float mode, at least one of the lower chamber and the upper chamber is at least partially pressurized to maintain a threshold level of pressure in the upper chamber.

12. The screeding machine of claim 7, wherein, when operating in the sensor control mode, the lower chamber and the upper chamber cooperate to limit downward creep of the screed head assembly.

13. The screeding machine of claim 1, wherein the base unit comprises an adjustable counterweight, and wherein the adjustable counterweight, when the screed head assembly is moved via extension or retraction of the extendable and retractable mechanism, is automatically moved in a direction opposite of movement of the screed head assembly to counter the weight of the screed head assembly when extended and retracted via the extendable and retractable mechanism.

14. The screeding machine of claim 13, wherein the adjustable counterweight is moved in the direction opposite of movement of the screed head assembly an amount proportional to the extension or retraction of the extendable and retractable mechanism.

15. The screeding machine of claim 1, wherein the control system is operable responsive to a remote controller usable by an operator remote from the screeding machine.

16. The screeding machine of claim 1, wherein the grade establishing member comprises one selected from the group consisting of (i) a roller plow and (ii) a vibrating plow.

17. The screeding machine of claim 1, wherein the screeding machine screeds uncured concrete placed within framework to form a tilt-up panel.

18. A screeding machine for screeding uncured concrete placed within framework to form a concrete structure, the screeding machine comprising:

a base unit positionable at framework that defines the concrete structure to be formed;

a screed head assembly movably mounted at the base unit via an extendable and retractable mechanism, wherein the screed head assembly comprises (i) a grade establishing member, (ii) a vibrating member, and (iii) adjustable wings disposed at and in front of the grade establishing member in a screeding direction, and wherein the adjustable wings are movable along the grade establishing member via respective actuators;

elevation actuators operable to adjust elevation of the screed head assembly responsive at least in part to elevation sensors that sense elevation of respective ends of the screed head assembly;

a control system, wherein the control system, responsive to signals from the elevation sensors, controls the elevation actuators to set the grade of the uncured concrete;

wherein the screed head assembly is positionable at a screeding location within the framework via extension of the extendable and retractable mechanism and is movable over the uncured concrete in the screeding direction from the screeding location via retraction of the extendable and retractable mechanism;

wherein, when one of the ends of the screed head assembly is positioned at a frame portion that defines part of the concrete structure being formed, the wing at that end of the screed head assembly is moved via actuation of the respective actuator to position the wing at the frame portion to limit excess concrete in front of the grade establishing member in the screeding direction from flowing over the frame portion when the screed head assembly is moved in the screeding direction; and wherein the actuators of the wings are actuated responsive to the control system determining presence of the frame portion at the screed head assembly.

19. The screeding machine of claim 18, wherein the control system determines presence of the frame portion via a sensor that generates an output indicative of presence of the frame portion at the screed head assembly.

20. The screeding machine of claim 18, wherein the control system determines presence of the frame portion via a map input indicative of presence of the frame portion at the screed head assembly.

21. A method of screeding uncured concrete placed within framework to form a concrete structure, the method comprising:

providing a screeding machine having (i) a base unit, (ii) a screed head assembly movably mounted at the base unit via an extendable and retractable mechanism, and (iii) elevation actuators operable to adjust elevation of the screed head assembly responsive at least in part to elevation sensors at respective ends of the screed head assembly, and wherein the screed head assembly comprises (i) a grade establishing member, (ii) a vibrating member, and (iii) adjustable wings disposed at and in front of the grade establishing member in a screeding direction, wherein the adjustable wings are movable along the grade establishing member via respective actuators;

arranging framework at a support surface to define the concrete structure to be formed;

placing uncured concrete within the framework;

positioning the base unit at a location at and outside of the framework;

extending the screed head assembly to a screeding location via extension of the extendable and retractable mechanism and lowering the screed head assembly to position the grade establishing member and vibrating member at the uncured concrete placed within the framework;

moving the screed head assembly over the uncured concrete in the screeding direction from the screeding location via retraction of the extendable and retractable mechanism;

operating via a control system the elevation actuators in a sensor control mode, where the elevation actuators adjust elevation of the screed head assembly responsive to the elevation sensors sensing an elevation of respective ends of the screed head assembly;

when one of the ends of the screed head assembly is positioned at a frame portion of the framework, moving the wing at that end of the grade establishing member via actuation of the respective actuator to position the wing at the frame portion to limit excess concrete in front of the grade establishing member in the screeding direction from flowing over the frame portion when the screed head assembly is moved in the screeding direction; and switching control of the screeding machine from the sensor control mode to a float mode when the screed head assembly is positioned at the frame portion.

22. The method of claim 21, wherein the screeding machine comprises a wheeled unit.

23. The method of claim 21, wherein the elevation sensors comprise laser receivers disposed at respective elevation actuators for sensing the elevation of the respective end of the screed head assembly relative to a laser generated reference plane established at the framework.

24. The method of claim 21, wherein actuation of the actuators of the wings comprises actuation of the actuators via a respective user actuatable input.

25. The method of claim 21, wherein, when control of the screeding machine is in the float mode when the screed head assembly is positioned at the frame portion, the elevation actuators do not adjust elevation of the screed head assembly responsive to the elevation sensors sensing an elevation of respective ends of the screed head assembly.

26. The method of claim 21, further comprising automatically switching from the float mode to the sensor control mode responsive to a drop of the screed head assembly by a threshold amount.

27. The method of claim 21, wherein the elevation actuators are disposed at the screed head assembly, and wherein each elevation actuator comprises (i) a double ended hydraulic cylinder having a lower rod having a first diameter and an upper rod having a second diameter different from the first diameter and (ii) a piston element disposed within the hydraulic cylinder, and wherein the lower rod extends from the piston element through a lower chamber of the hydraulic cylinder and the upper rod extends from the piston element through an upper chamber of the hydraulic cylinder.

28. The method of claim 27, wherein the first diameter is smaller than the second diameter.

29. The method of claim 27, wherein the first diameter is larger than the second diameter.

30. The method of claim 27, wherein, when operating in the float mode, the lower chamber and the upper chamber are not pressurized to allow the screed head assembly to move upward and downward relative to the hydraulic cylinder.

31. The method of claim 27, wherein, when operating in the float mode, at least one of the lower chamber and the upper chamber is at least partially pressurized to maintain a threshold level of pressure in the upper chamber.

32. The method of claim 27, wherein, when operating in the sensor control mode, the lower chamber and the upper chamber cooperate to limit downward creep of the screed head assembly.

33. The method of claim 21, further comprising, while moving the screed head assembly via extension or retraction of the extendable and retractable mechanism, automatically moving an adjustable counterweight at the base unit in a direction opposite of the movement of the screed head assembly to counter the weight of the screed head assembly when extended and retracted via the extendable and retractable mechanism.

34. The method of claim 33, wherein the adjustable counterweight is automatically moved in the direction opposite of movement of the screed head assembly an amount proportional to the extension or retraction of the extendable and retractable mechanism.

35. The method of claim 21, wherein the grade establishing member comprises one selected from the group consisting of (i) a roller plow and (ii) a vibrating plow.

36. The method of claim 21, wherein arranging the framework at the support surface comprises arranging framework to define a perimeter of a tilt-up panel to be formed and to define openings through the tilt-up panel to be formed.

37. A method of screeding uncured concrete placed within framework to form a concrete structure, the method comprising:

providing a screeding machine having (i) a base unit, (ii) a screed head assembly movably mounted at the base unit via an extendable and retractable mechanism, and (iii) elevation actuators operable to adjust elevation of the screed head assembly responsive at least in part to elevation sensors at respective ends of the screed head assembly, and wherein the screed head assembly comprises (i) a grade establishing member, (ii) a vibrating member, and (iii) adjustable wings disposed at and in front of the grade establishing member in a screeding direction, wherein the adjustable wings are movable along the grade establishing member via respective actuators;

arranging framework at a support surface to define the concrete structure to be formed;

placing uncured concrete within the framework;

positioning the base unit at a location at and outside of the framework;

extending the screed head assembly to a screeding location via extension of the extendable and retractable mechanism and lowering the screed head assembly to position the grade establishing member and vibrating member at the uncured concrete placed within the framework;

moving the screed head assembly over the uncured concrete in the screeding direction from the screeding location via retraction of the extendable and retractable mechanism;

operating via a control system the elevation actuators in a sensor control mode, where the elevation actuators adjust elevation of the screed head assembly responsive to the elevation sensors sensing an elevation of respective ends of the screed head assembly;

when one of the ends of the screed head assembly is positioned at a frame portion of the framework, moving the wing at that end of the grade establishing member via actuation of the respective actuator to position the wing at the frame portion to limit excess concrete in front of the grade establishing member in the screeding direction from flowing over the frame portion when the screed head assembly is moved in the screeding direction; and wherein actuation of the actuators of the wings comprises actuation of the actuators responsive to the control system determining presence of the frame portion at the screed head assembly.

38. The method of claim 37, wherein the control system determines presence of the frame portion via a sensor that generates an output indicative of presence of the frame portion at the screed head assembly.

39. The method of claim 37, wherein the control system determines presence of the frame portion via a map input indicative of presence of the frame portion at the screed head assembly.

* * * * *